United States Patent
Ayaki

(10) Patent No.: US 7,213,088 B2
(45) Date of Patent: May 1, 2007

(54) MASS STORAGE APPARATUS AND DATA OUTPUT METHOD OF OUTPUT DEVICE ATTACHED TO MASS STORAGE APPARATUS

(75) Inventor: Kenichiro Ayaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/251,752

(22) Filed: Sep. 23, 2002

(65) Prior Publication Data

US 2003/0061408 A1  Mar. 27, 2003

(30) Foreign Application Priority Data

Sep. 26, 2001  (JP)  ............ P.2001-294226

(51) Int. Cl.
  *G06F 3/00*  (2006.01)
  *G06F 13/12*  (2006.01)
(52) U.S. Cl. ............ 710/62; 710/5; 710/63; 710/72
(58) Field of Classification Search .......... 710/5, 710/7, 12, 20, 21, 73, 74, 8, 14, 62, 63, 72
See application file for complete search history.

(56) References Cited

U.S. PATENT DOCUMENTS

| | | | | |
|---|---|---|---|---|
| 5,926,756 A * | 7/1999 | Piosenka et al. | ............ | 455/418 |
| 6,229,737 B1 * | 5/2001 | Walukas | ............ | 365/185.33 |
| 6,512,722 B2 * | 1/2003 | Kumagai | ............ | 369/30.05 |
| 6,587,901 B2 * | 7/2003 | Nishikawa et al. | ............ | 710/100 |
| 6,647,480 B1 * | 11/2003 | Bolan et al. | ............ | 711/170 |
| 6,697,944 B1 * | 2/2004 | Jones et al. | ............ | 713/168 |
| 2001/0003941 A1 * | 6/2001 | Sawada et al. | ............ | 84/601 |
| 2002/0071139 A1 * | 6/2002 | Janik | ............ | 358/1.15 |
| 2002/0083236 A1 * | 6/2002 | Wang | ............ | 710/62 |
| 2002/0099550 A1 * | 7/2002 | Emerick, Jr. | ............ | 704/270 |
| 2002/0107802 A1 * | 8/2002 | Philips | ............ | 705/51 |
| 2003/0176935 A1 * | 9/2003 | Lian et al. | ............ | 700/94 |
| 2003/0194211 A1 * | 10/2003 | Abecassis | ............ | 386/69 |

FOREIGN PATENT DOCUMENTS

| | | | |
|---|---|---|---|
| EP | 001128692 A2 * | 8/2001 | |
| JP | 2918036 | 4/1999 | |
| WO | WO 00/60918 | * | 10/2000 |

OTHER PUBLICATIONS

RD 418015 A, Cellular Phone with integrated MP3 player, Ericsson Onc, Feb. 10, 1999.*
Microsoft Computer Dictionary, Fifth Edition, copyright 2002. Definitions for ASCII, ASCII character set, and graphic data.*

* cited by examiner

*Primary Examiner*—Alan S. Chen
(74) *Attorney, Agent, or Firm*—Sughrue Mion, PLLC

(57) ABSTRACT

When reading/writing data between a computer and a mass storage of a mass storage apparatus, the data transmitted from the computer are immediately confirmed by using an output device attached to the mass storage apparatus. There is provided a control device 101 for interpreting a command received from a control device 120 and for carrying out an output processing to an output device 103 if it is decided that the received command is a command for giving an instruction for outputting data stored in a mass storage 102 to the output device 103 in a state of a connection to the control device.

36 Claims, 2 Drawing Sheets

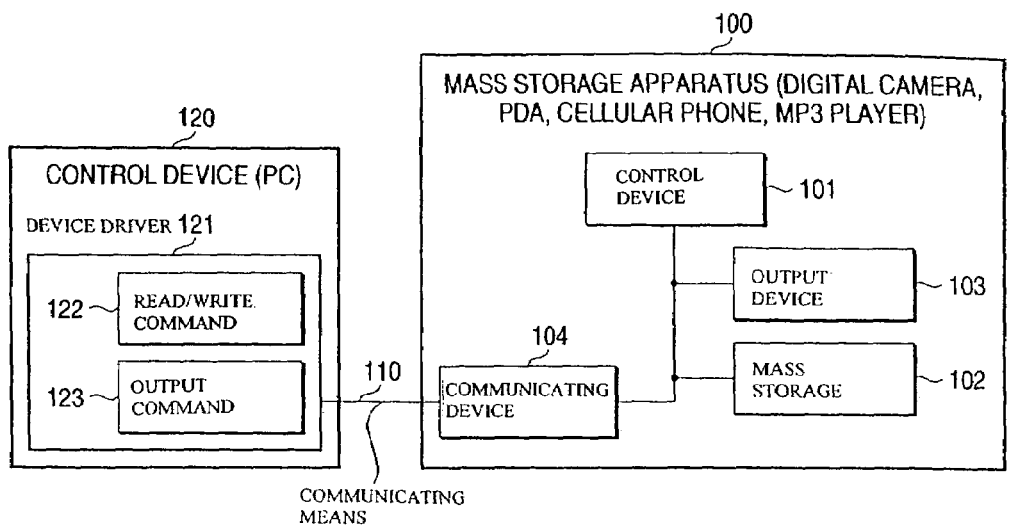
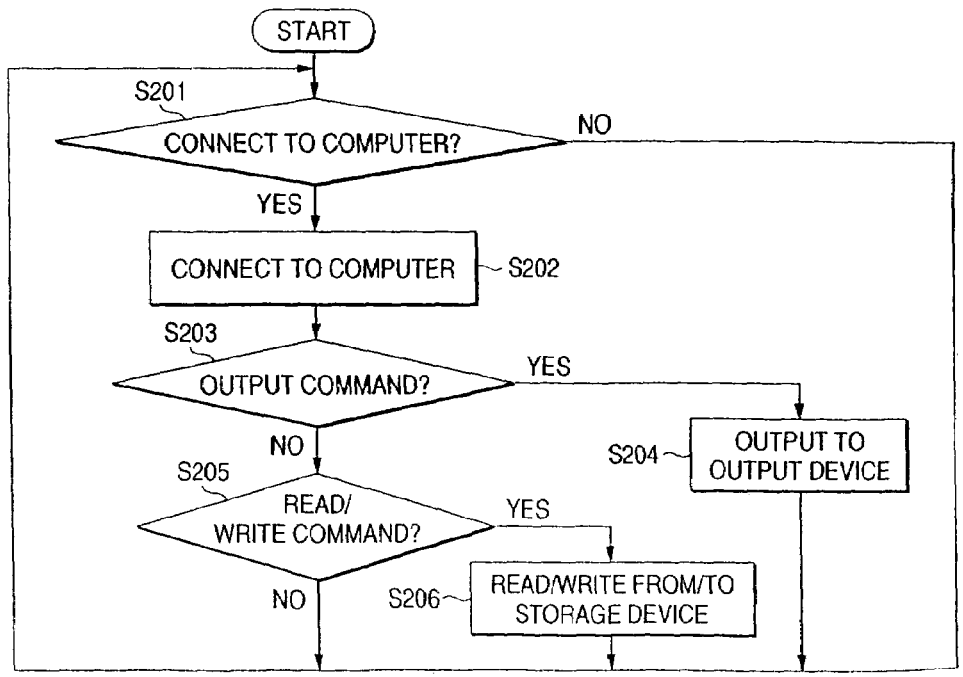

MASS STORAGE APPARATUS AND DATA OUTPUT METHOD OF OUTPUT DEVICE ATTACHED TO MASS STORAGE APPARATUS

BACKGROUND OF THE INVENTION

1. Field of the Invention

The present invention relates to a mass storage apparatus comprising a mass storage capable of carrying out read/write from/to an external device and an output device capable of outputting image data and voice data which are stored in the mass storage, and a method of outputting data to the output device mounted on the mass storage apparatus.

2. Description of the Related Art

A mass storage apparatus having an output function such as image display or voice output, for example, a digital camera, a portable telephone, a PDA (Personal Digital Assistants) or an MP3 player is connected to a computer to exchange data, thereby obtaining various advantages to enlarge an application range in addition to the original function of the mass storage apparatus.

When the mass storage apparatus is connected to a computer to exchange data, conventionally, data are read/written from/to the computer for a mass storage mounted on the mass storage apparatus. This operation is carried out by transmitting a read/write command for the mass storage from the computer through a connecting interface with the mass storage apparatus.

Referring to a technique for connecting the mass storage apparatus to the computer to exchange data, Japanese Patent No. 2918036 has disclosed a media viewer technique with an eye to directly viewing data stored in the mass storage of the mass storage apparatus.

In the patent, a portable storage device mainly supposing a hard disk is used as data media capable of exchanging a notebook computer and a mobile apparatus, and furthermore, is connected to a display device and is thus used as a media viewer. For this purpose, there is a function of controlling a connection depending on a connecting partner.

In the conventional technique, however, there has not been proposed a method of positively utilizing an output device to be attached to the mass storage apparatus when reading and writing data between the mass storage and the computer. When reading and writing data between the mass storage and the computer, conventionally, a fixed alarm display is carried out for these output devices at most.

The reason is as follows. When the mass storage apparatus is connected to the computer, the computer acquires the use right of the mass storage of the mass storage apparatus, and the mass storage is used by transmitting only the read/write command of data stored in the mass storage from the computer to the mass storage apparatus and the output device attached to the mass storage apparatus is not used. The user of the mass storage apparatus needs to disconnect the mass storage apparatus from the computer after data are transmitted to the mass storage and to operate the mass storage apparatus to confirm the data, and cannot immediately confirm the data transmitted from the computer with a connection to the computer.

If image data to be displayed in the mass storage apparatus are edited by a personal computer, moreover, it is generally difficult to obtain an expected output because characteristics on the output apparatus side are different from each other. For example, the display screen of a portable telephone set controls a screen size, a resolution and the number of colors. Therefore, there is a problem in that a remarkable difference is particularly made if the edit is carried out by the personal computer. Since the speaker of the portable telephone set also has a small dynamic range, moreover, different sounds are heard actually.

SUMMARY OF THE INVENTION

The invention has been made in consideration of the circumstances and has an object to provide a method of practically using an output device attached to a mass storage apparatus when reading and writing data between a mass storage and a computer and to provide the mass storage apparatus capable of immediately confirming the data transmitted from the computer to the mass storage and a data output method of the output device attached to the mass storage apparatus.

A first aspect of the invention is directed to a mass storage apparatus including a mass storage (a mass storage 102) capable of carrying out read/write from/to an external control device (a control device 120), an output device (an output device 103) capable of outputting data stored in the mass storage, and control means (a control device 101) for interpreting a command received from the external control device in a state of a connection with the external control device and for carrying out an output processing to the output device if it is decided that the received command is an output command for giving an instruction for outputting the data stored in the mass storage to the output device.

A sixth aspect of the invention is directed to a data output method of an output device attached to a mass storage apparatus comprising a mass storage capable of carrying out read/write from/to an external control device and attaching the output device capable of outputting data stored in the mass storage, wherein the external control device connected to the mass storage apparatus through communicating means transmits, to the mass storage apparatus, an output command for giving an instruction for outputting the data stored in the mass storage to the output device (S305), and the mass storage apparatus outputs the data stored in the mass storage to the output device upon receipt of the output command (S204).

According to the first and sixth aspects of the invention, the output command for outputting the data stored in the mass storage to the output device attached to the mass storage apparatus is received and interpreted to carry out the output processing for the output device. Consequently, the data transmitted from the external control device such as a computer to the mass storage can be immediately confirmed on the mass storage apparatus side.

A second aspect of the invention is directed to the mass storage apparatus according to the first aspect of the invention, wherein data to be input to the output device upon receipt of the output command are included in the output command in place of the data stored in the mass storage.

According to the mass storage apparatus in accordance with the second aspect of the invention, the output command itself is caused to include the data to be output to the output device. Consequently, it is possible to carry out an output without a time delay through the mass storage. For example, it is possible to use the mass storage for outputting an alarm.

A third aspect of the invention is directed to the mass storage apparatus according to the first or second aspect of the invention, wherein the output device is a display for displaying an image, a graphic or a character. Moreover, a fourth aspect of the invention is directed to the mass storage apparatus, wherein the output device is a speaker for outputting a voice.

According to the mass storage apparatus in accordance with the third aspect of the invention, the image data edited on the outside are displayed on the display device of the mass storage apparatus. Consequently, the edited data can be confirmed immediately. According to the mass storage apparatus in accordance with the fourth aspect of the invention, moreover, the voice data edited on the outside are reproduced by the speaker of the mass storage apparatus. Consequently, the edited data can be confirmed immediately.

A fifth aspect of the invention is directed to a control device comprising means (a device driver 121) for transmitting, to a mass storage apparatus (a mass storage apparatus 100) comprising a mass storage (a mass storage 102) capable of carrying out read/write from/to an outside and an output device capable of outputting data stored in the mass storage, a read/write command (a read/write command 122) for giving an instruction of a read/write processing to the mass storage and an output command (an output command 123) for giving an instruction of an output processing to the output device in a state of a connection to the mass storage apparatus.

According to the control device in accordance with the fifth aspect of the invention, the read/write command and the output command are transmitted from a computer connected to the mass storage apparatus to the mass storage apparatus. Consequently, it is possible to control both the mass storage and the output device in the mass storage apparatus.

BRIEF DESCRIPTION OF THE DRAWINGS

FIG. 1 is a block diagram showing the structure of a mass storage apparatus according to an embodiment of the invention, FIG. 2 is a flow chart showing the operation of the mass storage apparatus according to the embodiment of the invention.

Figure 3:
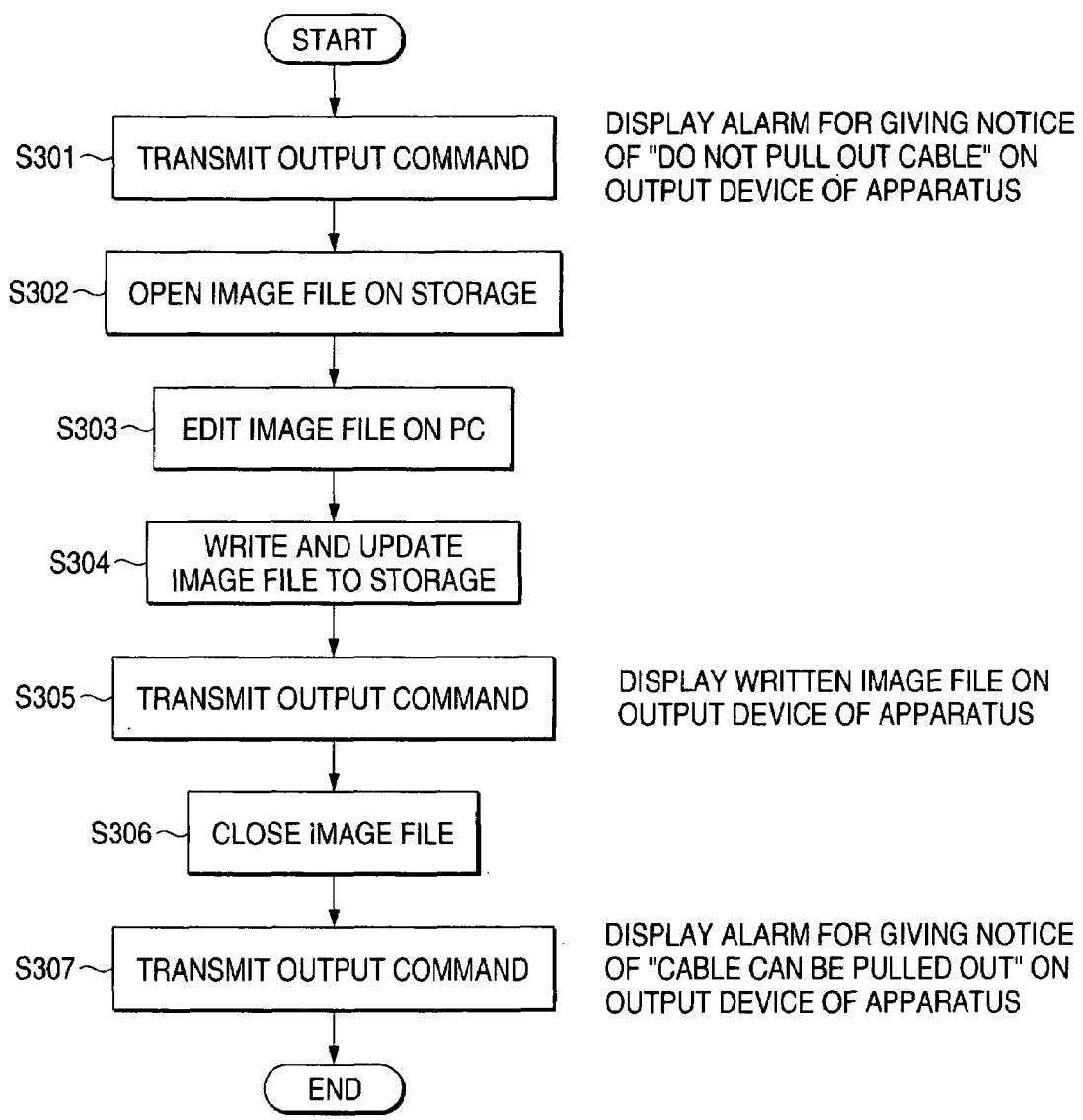
FIG. 3 is a flow chart showing the operation of a control device according to the embodiment of the invention.

In the figures, the reference numeral 100 refers to a mass storage apparatus; 101 to a control device; 102 to a mass storage; 103 to an output device; 104 to a communicating device; 110 to communicating means; 120 to a control device; 121 to a device driver; 122 to a read/write command; and 123 to an output command.

DETAILED DESCRIPTION OF THE PREFERRED EMBODIMENTS

An embodiment of the invention will be described below with reference to the drawings. FIG. 1 is a block diagram showing the structure of a mass storage apparatus according to an embodiment of the invention.

In FIG. 1, 100 denotes a mass storage apparatus such as a digital camera, a portable telephone, a PDA or an MP3 player, 120 denotes a control device such as a computer, and 110 denotes communicating means for connecting the control device to the mass storage apparatus.

The mass storage apparatus 100 is constituted by a control device 101 for controlling the whole apparatus, a mass storage 102 for storing data, an output device 103 capable of outputting the data stored in the mass storage 102, and a communicating device 104 for carrying out a communication with an external apparatus. For example, the output device 103 is a liquid crystal display if the mass storage apparatus is a digital camera, a portable telephone or a PDA, and is a voice output device on the MP3 standards if the mass storage apparatus is an MP3 player. Moreover, the mass storage is a memory card or a hard disk.

The communicating means 110 may be an optional method capable of connecting the control device to the mass storage apparatus to accurately carry out a communication whether it is wired or wireless. If the communicating means 110 is wired, it is possible to use various standard interfaces such as USB, SCSI, IEEE 802.1, IEEE 1394, ATA and ATPI. If the communicating means 110 is wireless, it is also possible to use a simple interface using infrared rays, for example, in addition to a standard interface of a radio communication such as a blue tooth. Furthermore, a network may be used. FIG. 1 shows an example in which the USB is used.

In the case in which the control device 120 is connected to the mass storage apparatus, a processing program for reading/writing data from/to the mass storage 102 through the communicating means 110 is executed. A command for giving an instruction to the mass storage apparatus by the processing program includes an output command 123 for outputting data stored in the mass storage 102 from the output device 103 in addition to a command 122 for causing a device driver 121 to read/write data from/to the mass storage 102.

For example, in the case in which the communicating means is the USB, an output command can be newly defined into an area having a value which is not coincident with the command code of a mass storage class (for example, between 0×CO and 0×FF in hexadecimal numbers).

For a transmission timing and contents to be displayed, an alarm of "Do not pull out an apparatus" is displayed when the mass storage starts to access a data file, the data are displayed on a liquid crystal monitor when the data file is written, and a message of "The apparatus can be pulled out" is displayed when all the data files are completely accessed. The contents to be displayed may be defined to an output command itself.

The control device may be a computer, and furthermore, may be a peripheral electronic apparatus having a control function which is connected to the mass storage apparatus.

FIG. 2 is a flow chart showing the operation of the mass storage apparatus according to the invention, and FIG. 3 is a flow chart showing the operation of the control device (computer) according to the embodiment. The operation according to the embodiment having the structure shown in FIG. 1 will be described below with reference to the flow charts of FIGS. 2 and 3.

In FIG. 2, first of all, a connection with a computer is checked (S201). The check of the connection is varied depending on communicating means to be employed. If an interface is USB, for example, a change in a voltage of a power line is detected to check the connection with the computer.

If the connection with the computer is detected, a processing required for the connection is carried out (S202). When a command is received from the computer, whether the received command is an output command is checked (S203). If the received command is the output command, the data of a mass storage are output to an output device (S204).

If the received command is not the output command, whether the command is a read/write command is checked (S205). If the received command is the read/write command, data are read/written from/to the mass storage (S206).

On the other hand, an output command for displaying an alarm for giving a notice of "Do not pull out a cable" on the output device such as a liquid crystal monitor is first transmitted to the mass storage apparatus on the computer side shown in FIG. 3.

Next, an image file to be a display object is opened (S302), for example, the image file is edited (S303), and the updated image file is written to the storage of the mass storage apparatus by using a read/write command (S304). Subsequently, an output command for outputting the image file written to the storage is transmitted (S305). Consequently, the image file thus written is displayed on the liquid crystal monitor.

After the above processings are completed, the image file is closed on the computer side (S306) and an output command for displaying a notice of "The cable can be pulled out" on the output device such as a liquid crystal monitor is transmitted to the mass storage apparatus (S307).

As described above, according to the embodiment, in the case in which image data to be displayed on the mass storage apparatus are edited, for example, the image data can be actually displayed and can be successively monitored and edited. Thus, the result of the display can easily be reflected on the edit.

These effects are not restricted to the image display but are valid for various outputs. For example, it is possible to edit and confirm a "receiving melody" output in a voice to a portable telephone set. Also in the case in which a character is to be displayed, moreover, a displayed Chinese character can be confirmed and edited when the mass storage apparatus side does not have any proper kanji font, for example. Also in the case in which the output device to be attached is a printer, furthermore, the invention can be applied.

As described above, according to the invention, the output command for outputting the data stored in the mass storage to the output device attached to the mass storage apparatus is received and interpreted, and the output processing to the output device is carried out. Consequently, it is possible to immediately confirm the data transmitted from the external control device such as a computer to the mass storage on the mass storage side.

What is claimed is:

1. A mass storage apparatus comprising:
   a user interface for accepting user commands to the mass storage apparatus;
   a mass storage that reads from and writes to an external control device, the external control device being separate and external to the mass storage apparatus;
   an output device outputting data stored in the mass storage; and
   control means that interprets a command received from the external control device in a state of a connection with the external control device and performs output processing to the output device if the control means determines that the received command is an output command for giving an instruction for outputting the data previously stored in the mass storage to the output device,
   wherein the data previously stored in the mass storage comprises text data and at least one of graphic data and audio data, and
   wherein, when the outputted data is audio data, the audio data is outputted in an audible manner.

2. The mass storage apparatus according to claim 1, wherein the output command includes:
   data to be input to the output device upon receipt of the output command in place of the data stored in the mass storage.

3. The mass storage apparatus according to claim 1 or 2, wherein the output device is a display for displaying an image, a graphic or a character.

4. The mass storage apparatus according to claim 1 or 2, wherein the output device is a speaker for outputting a voice.

5. A control device comprising:
   means for transmitting a read/write command and an output command to a mass storage apparatus in a state that the control device is connected to the mass storage apparatus, the mass storage apparatus being separate and external to the control device;
   wherein the mass storage apparatus includes a user interface for accepting user commands to the mass storage apparatus, a mass storage that reads from and writes to the control device and an output device outputting data previously stored in the mass storage,
   wherein the data previously stored in the mass storage comprises text data and at least one of graphic data and audio data,
   wherein the read/write command is utilized for giving an instruction of a read/write processing to the mass storage,
   wherein the output command is utilized for giving an instruction of an output processing to the output device to output data previously stored in the mass storage, and
   wherein, when the outputted data is audio data, the audio data is outputted in an audible manner.

6. A system comprising:
   a mass storage apparatus including
      a user interface for accepting user commands to the mass storage apparatus,
      a mass storage that reads from and writes to an external control device, the external control device being separate and external to the mass storage apparatus,
      an output device outputting data stored in the mass storage,
      control means that interprets a command received from the external control device in a state of a connection with the external control device and performs output processing to the output device if the control means determines that the received command is an output command for giving an instruction for outputting the data previously stored in the mass storage to the output device;
   the external control device including
      means for transmitting a read/write command, and
      an output command to the mass storage apparatus in a state that the external control device is connected to the mass storage apparatus; and
   communicating means for connecting the mass storage apparatus to the control device,
   wherein the data previously stored in the mass storage comprises text data and at least one of graphic data and audio data,
   wherein the read/write command is utilized for giving an instruction of a read/write processing to the mass storage,
   wherein the output command is utilized for giving an instruction of an output processing to the output device, and
   wherein, when the outputted data is audio data, the audio data is outputted in an audible manner.

7. The system according to claim 6, wherein the communicating means is a wired interface.

8. The system according to claim 6,
wherein the communicating means is a wired interface based on any one of standard interfaces, which are USB, SCSI, IEEE 802.1, IEEE 1394, ATA and ATPI USB.

9. The system according to claim 6,
wherein the communicating means is a wireless interface.

10. The system according to claim 6,
wherein the communicating means is a wireless interface using infrared rays.

11. The system according to claim 6,
wherein the communicating means is a network.

12. A processing program for instructing a computer to perform the function of:
transmitting a read/write command and an output command to a mass storage apparatus;
wherein the computer is connected through communicating means to the mass storage apparatus,
wherein the mass storage apparatus includes
a user interface for accepting user commands to the mass storage apparatus,
a mass storage that reads from and writes to an outside device, the outside device being separate and external to the mass storage apparatus, and
an output device outputting data previously stored in the mass storage,
wherein the data previously stored in the mass storage comprises text data and at least one of graphic data and audio data,
wherein the read/write command is utilized for giving an instruction of a read/write processing to the mass storage,
wherein the output command is utilized for giving an instruction of an output processing to the output device to output data previously stored in the mass storage, and
wherein, when the outputted data is audio data, the audio data is outputted in an audible manner.

13. A storage medium readable by a computer for storing a processing program,
wherein the processing program is utilized for instructing the computer to perform the function of transmitting a read/write command and an output command,
wherein the computer is connected through communicating means to a mass storage apparatus,
wherein the mass storage apparatus includes
a user interface for accepting user commands to the mass storage apparatus,
a mass storage that reads from and writes to an outside device, the outside device being separate and external to the mass storage apparatus, and
an output device outputting data previously stored in the mass storage,
wherein the data previously stored in the mass storage comprises text data and at least one of graphic data and audio data,
wherein the read/write command is utilized for giving an instruction of a read/write processing to the mass storage,
wherein the output command is utilized for giving an instruction of an output processing to the output device to output data previously stored in the mass storage, and
wherein, when the outputted data is audio data, the audio data is outputted in an audible manner.

14. A data output method utilized in an output device attached to a mass storage apparatus including a user interface for accepting user commands to the mass storage apparatus and a mass storage that reads from and writes to an external control device, the method comprising the steps of:
transmitting an output command for instructing the mass storage apparatus to output a data stored in the mass storage from the external control device to the mass storage apparatus; and
at the mass storage apparatus, outputting the data previously stored in the mass storage on the output device, upon receipt of the output command,
wherein the data previously stored in the mass storage comprises text data and at least one of graphic data and audio data,
wherein, when the outputted data is audio data, the audio data is outputted in an audible manner,
wherein the external control device is connected to the mass storage apparatus through a communicating means, and
wherein the external control device is separate and external to the mass storage apparatus.

15. An electronic apparatus comprising:
a control device including:
means for transmitting a read/write command and an output command to a mass storage apparatus in a state of that the control device is connected to the mass storage apparatus;
wherein the mass storage apparatus includes
a user interface for accepting user commands to the mass storage,
a mass storage that reads from and writes to the control device, the control device being separate and external to the mass storage apparatus, and
an output device outputting data previously stored in the mass storage,
wherein the data previously stored in the mass storage comprises text data and at least one of graphic data and audio data,
wherein the read/write command is utilized for giving an instruction of a read/write processing to the mass storage,
wherein the output command is utilized for giving an instruction of an output processing to the output device to output data previously stored in the mass storage,
wherein, when the outputted data is audio data, the audio data is outputted in an audible manner.

16. The apparatus of claim 1, wherein said apparatus is one of a portable phone, a Personal Digital Assistant (PDA), a digital camera, and an MP3 player.

17. The apparatus of claim 1, wherein said mass storage carries out a write to operation to the external control device.

18. The apparatus of claim 17, wherein said apparatus comprises an MP3 player.

19. The apparatus of claim 1,
wherein the output device simultaneously provides a notification message to a user of the apparatus during the writing of data to the mass storage.

20. The apparatus of claim 1, wherein, when the control means determines that the received command is not an output command, the control means processes a read/write operation from/to the mass storage device without carrying out the output processing to the output device.

21. The apparatus of claim 1, wherein the external control device sends an output command to output data stored in the mass storage device to the output device.

22. The apparatus of claim 1, wherein the external control device and the mass storage apparatus are independent devices when the external control device and the mass storage apparatus are not in a state of connection.

23. The control device of claim 5, wherein the control device and the mass storage apparatus are independent devices when the control device and the mass storage apparatus are not in a state of connection.

24. The system of claim 6, wherein the external control device and the mass storage apparatus are independent devices when the external control device and the mass storage apparatus are not in a state of connection.

25. The processing program for instructing a computer of claim 12, wherein the computer and the mass storage apparatus are independent devices when the computer and the mass storage apparatus are not connected.

26. The storage medium of claim 13, wherein the computer and the mass storage apparatus are independent devices when the computer and the mass storage apparatus are not connected.

27. The data output method of claim 14, wherein the external control device and the mass storage apparatus are independent devices when the external control device and the mass storage apparatus are not connected.

28. The electronic apparatus of claim 15, wherein the control device and the mass storage apparatus are independent devices when the control device and the mass storage apparatus are not in a state of connection.

29. The mass storage apparatus according to claim 1, wherein when the mass storage apparatus is connected to the external control device, the external control device acquires a use right of the mass storage, and the mass storage apparatus is deprived of the use right of the mass storage.

30. The control device according to claim 5, wherein when the mass storage apparatus is connected to the control device, the control device acquires a use right of the mass storage, and the mass storage apparatus is deprived of the use right of the mass storage.

31. The system according to claim 6, wherein when the mass storage apparatus is connected to the external control device, the external control device acquires a use right of the mass storage, and the mass storage apparatus is deprived of the use right of the mass storage.

32. The mass storage apparatus according to claim 1, wherein the mass storage is a memory card or a hard disk.

33. The control device according to claim 5, wherein the mass storage is a memory card or a hard disk.

34. The system according to claim 6, wherein the mass storage is a memory card or a hard disk.

35. The control device according to claim 5, wherein the mass storage apparatus is one of a portable phone, a Personal Digital Assistant (PDA), a digital camera, and an MP3 player.

36. The system according to claim 6, wherein the mass storage apparatus is one of a portable phone, a Personal Digital Assistant (PDA), a digital camera, and an MP3 player.

* * * * *